(12) United States Patent
Ivanov et al.

(10) Patent No.: US 12,470,795 B2
(45) Date of Patent: Nov. 11, 2025

(54) OPTICAL SYSTEM AND METHOD FOR UNDER DISPLAY CAMERA

(71) Applicant: Samsung Electronics Co., Ltd., Suwon-si (KR)

(72) Inventors: Stepan Evgenievich Ivanov, Moscow (RU); Elena Gennadievna Malinovskaya, Moscow (RU); Sergey Evgenievich Dubynin, Moscow (RU); Alexey Grigorievich Anikanov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 18/594,412

(22) Filed: Mar. 4, 2024

(65) Prior Publication Data

US 2024/0305875 A1    Sep. 12, 2024

(30) Foreign Application Priority Data

Mar. 6, 2023 (RU) .................. 2023105125
Jun. 9, 2023 (KR) ............... 10-2023-0074289

(51) Int. Cl.
*H04N 23/55* (2023.01)
*G02B 27/42* (2006.01)

(52) U.S. Cl.
CPC ......... *H04N 23/55* (2023.01); *G02B 27/4205* (2013.01)

(58) Field of Classification Search
CPC ..... G02B 27/42; G02B 27/4205; H04N 23/55

USPC ......................................................... 348/340
See application file for complete search history.

(56) References Cited

U.S. PATENT DOCUMENTS

| | | | |
|---|---|---|---|
| 7,714,923 B2 | 5/2010 | Cok et al. | |
| 7,808,540 B2* | 10/2010 | Cok | H04N 7/144 |
| | | | 348/333.01 |
| 11,115,596 B2* | 9/2021 | Chu | G09G 3/3208 |
| 11,616,114 B2* | 3/2023 | Jeong | H10K 59/126 |
| | | | 348/373 |
| 11,740,483 B2* | 8/2023 | Wang | G02B 27/0012 |
| | | | 359/558 |
| 11,812,123 B2* | 11/2023 | Kim | H04N 9/3179 |
| 11,974,034 B2* | 4/2024 | Li | H10K 59/12 |
| 12,101,565 B2* | 9/2024 | Kim | H04N 23/71 |

(Continued)

FOREIGN PATENT DOCUMENTS

KR   10-2022-0072529 A    6/2022
KR   10-2022-0129369 A    9/2022

*Primary Examiner* — Pritham D Prabhakher
(74) *Attorney, Agent, or Firm* — NSIP Law

(57) ABSTRACT

An optical system of an under-display camera (UDC) includes: a display comprising pixels having a first periodic structure; an image sensor disposed under a screen of the display; one or more optical elements disposed between the display and the image sensor and configured to form an image of an external scene on the image sensor; and an additional diffraction member comprising an array of elements having a second periodic structure and configured such that the second periodic structure overlaps the first periodic structure by an offset of the elements to redirect a second light which is a portion of a first light corresponding to the external scene transmitted to the image sensor through the display.

20 Claims, 12 Drawing Sheets

(56) References Cited

U.S. PATENT DOCUMENTS

| | | | | |
|---|---|---|---|---|
| 2008/0106628 A1* | 5/2008 | Cok | ................ | H04N 7/144 |
| | | | | 348/E5.022 |
| 2008/0165267 A1* | 7/2008 | Cok | ................ | H04N 7/144 |
| | | | | 348/E5.022 |
| 2020/0408971 A1 | 12/2020 | Zhu et al. | | |
| 2020/0409163 A1 | 12/2020 | Zhu et al. | | |
| 2021/0136291 A1 | 5/2021 | Chu et al. | | |
| 2021/0167163 A1 | 6/2021 | Jeong et al. | | |
| 2021/0247621 A1* | 8/2021 | Yang | ................ | H04N 23/57 |
| 2021/0368081 A1 | 11/2021 | Kim et al. | | |
| 2022/0191362 A1* | 6/2022 | Li | ................ | G02B 27/4216 |
| 2022/0394175 A1* | 12/2022 | Kim | ................ | H04N 23/52 |
| 2023/0142069 A1* | 5/2023 | Fan | ................ | H04M 1/0266 |
| | | | | 359/567 |
| 2023/0157105 A1* | 5/2023 | Jeon | ................ | H10K 59/131 |
| | | | | 257/40 |

\* cited by examiner

OPTICAL SYSTEM AND METHOD FOR UNDER DISPLAY CAMERA

CROSS-REFERENCE TO RELATED APPLICATIONS

This application claims priority from Russian Patent Application No. 2023105125, filed on Mar. 6, 2023 in the Russian Federal Service for Intellectual Property, and Korean Patent Application No. 10-2023-0074289, filed on Jun. 9, 2023 in the Korean Intellectual Property Office, the entire disclosures of which are incorporated herein by reference for all purposes.

BACKGROUND

1. Field

The following description relates to an optical system and method for an under-display camera (UDC).

2. Description of Related Art

A portable electronic device such as a smartphone may adopt a "full screen" design by which its touchscreen occupies the entire or almost the entire front surface without a separate area such as a front area occupied by a front camera for capturing images. The portable electronic device adopting the full screen design has made possible the use of an under-display camera (UDC) in which an optical module of a front camera for capturing images in a mobile device is disposed under the surface of a touchscreen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an optical system of an under-display camera (UDC) includes: a display comprising pixels having a first periodic structure; an image sensor disposed under a screen of the display; one or more optical elements disposed between the display and the image sensor and configured to form an image of an external scene on the image sensor; and an additional diffraction member comprising an array of elements having a second periodic structure and configured such that the second periodic structure overlaps the first periodic structure by an offset of the elements to redirect a second light which is a portion of a first light corresponding to the external scene transmitted to the image sensor through the display.

The array of the elements may overlap an array of the pixels to attenuate the second light.

The additional diffraction member may be either one of integrated into the display and disposed in front of the display.

The additional diffraction member may constitute a layer between the display and the one or more optical elements.

The elements may each have a shape of any one of circle, square, rectangle, regular pentagon, regular hexagon, and regular octagon.

The elements may have the same transmittance or different transmittances, along one or more axes of the array.

The elements may each have a transmittance greater than or equal to zero (0).

A size of each of the elements arranged along one or more axes of the array may be 0.5 times a size of each of the pixels.

The elements may be shifted along one or more axes of the array by an offset of 0.5 times a first arrangement period of the first periodic structure.

A second arrangement period of the second periodic structure may be the same as a first arrangement period of the first periodic structure.

The optical system may include a controller configured to generate the image based on the first light corresponding to the external scene transmitted to the image sensor through the display.

In one or more general aspects, an electronic device includes: a memory; a display comprising pixels having a first periodic structure; a camera module; and a processor operatively connected to the display, the camera module, and the memory, wherein the camera module comprises: an image sensor disposed under a screen of the display; one or more optical elements disposed between the display and the image sensor and configured to form an image of an external scene on the image sensor; and an additional diffraction member comprising an array of elements having a second periodic structure and configured such that the second structure overlaps the first structure by an offset of the elements to redirect a second light which is a portion of a first light corresponding to the external scene transmitted to the image sensor through the display.

The processor may be configured to: transmit the first light from the external scene imaged through the first structure of the pixels; and shift the elements based on the offset such that the second structure overlaps the first structure at regular intervals.

The elements may each have a transmittance greater than or equal to zero (0).

A size of each of the elements arranged along at one or more axes of the array may be 0.5 times a size of each of the pixels.

The elements may be shifted along one or more axes of the array by an offset of 0.5 times a first arrangement period of the first structure.

A second arrangement period of the second structure may be the same as a first arrangement period of the first structure.

In one or more general aspects, a processors-implemented method of operating an optical system of an under-display camera (UDC) includes: transmitting a first light from an imaged scene through a first periodic structure of pixels of a display; and by an array of elements having a second periodic structure of an additional diffraction member and overlapping the first structure by an offset of the elements, redirecting a second light which is a portion of the first light by diffraction of the additional diffraction member.

The array of the elements of the additional diffraction member may overlap an array of the pixels to attenuate the second light.

The method may include shifting the elements with respect to the pixels along one or more axes of the array by 0.5 times a first arrangement period of the first structure.

Other features and aspects will be apparent from the following detailed description, the drawings, and the claims.

Figure 1:
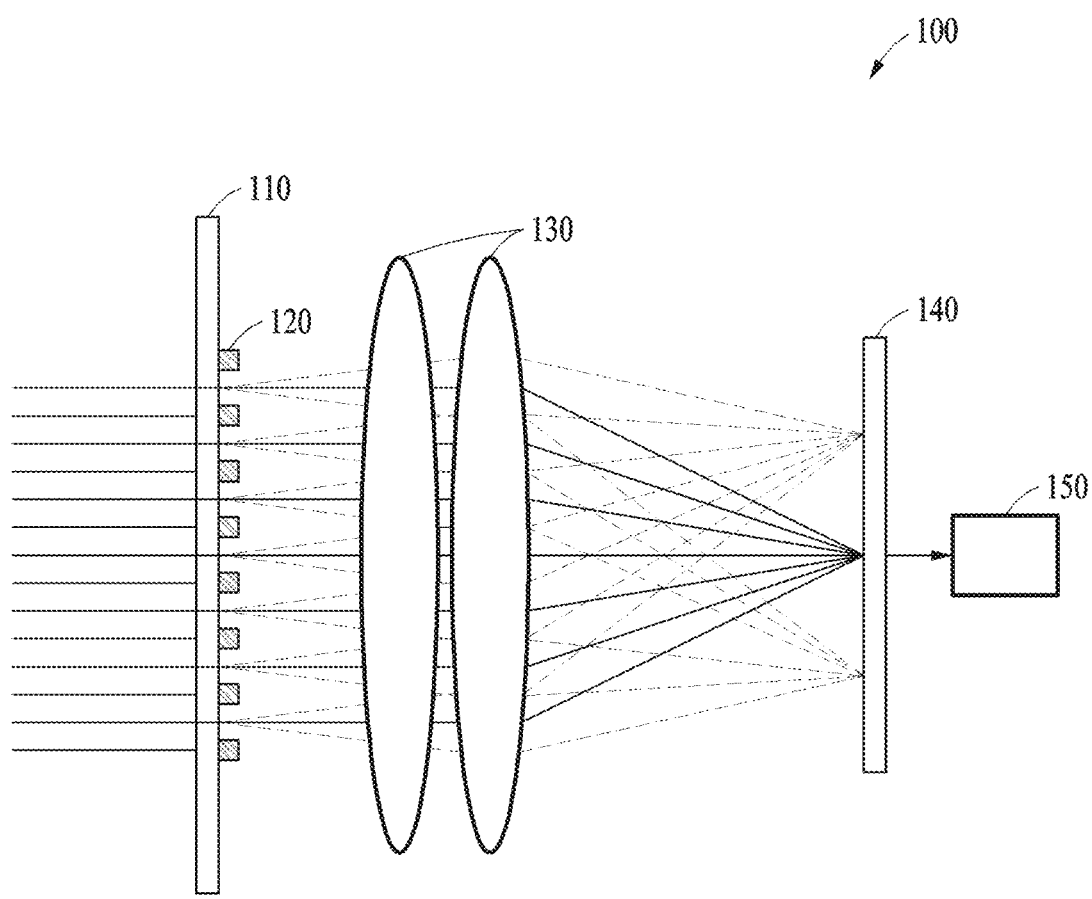
FIG. 1 illustrates a schematic diagram of an example optical system, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms of "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meanings as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto will be omitted.

FIG. 1 illustrates a schematic diagram of an example optical system, in accordance with one or more embodiments. Referring to FIG. 1, an optical system 100 of an under-display camera (UDC) of one or more embodiments will be described.

The optical system 100 may be an optical system of a physical camera for capturing images or videos while hidden under a display of, for example, a mobile device or a portable electronic device. In an example, the physical camera may be disposed under the display, rather than in a separate area of a front surface of the electronic device, which is referred to as an under-display camera, or a UDC. Hereinafter, the term "camera" will be understood as referring to a UDC unless otherwise described.

The optical system 100 may include a display 110, an additional diffraction member 120, at least one optical element 130 (e.g., at least one lens), an image sensor 140, and a controller 150.

The display 110 may have a first periodic structure of pixels. The display 110 may visually provide a user with image data corresponding to an image of an external scene (also, a real-world scene) by the pixels.

When the at least one optical element 130 blocks a portion of an incident light of the captured scene and practically provides a diffraction grating for the optical system 100 of the camera, structural elements of the display 110 may negatively affect the quality of an image generated by the optical system 100 of the camera depending on the incident light of the captured scene. The structural elements of the display 110 may include, for example, thin-film transistors of pixels, conductive bus bars, and transparent gaps between pixels, but examples of which are not necessarily limited thereto.

For example, the display 110 may include a plurality of pixels arranged in an array of a horizontal direction X and a vertical direction Y and forming a periodic diffraction structure. The plurality of pixels may induce a diffraction effect of a light incident on an optical module of a front camera to degrade the quality of an image formed by the image sensor 140 arranged under a screen of the display 110.

The display 110 may have a partially transparent screen. The display 110 may be implemented by, for example, organic light-emitting diodes (OLEDs), but is not necessarily limited thereto.

The additional diffraction member 120 may be configured in the form of an array of elements having a second periodic structure that overlaps the pixels having the first periodic structure of the display 110. The additional diffraction member 120 may allow the second structure to overlap the first structure (e.g., may be configured or constructed such that the second structure overlaps the first structure) by an offset of the elements having the second periodic structure to redirect a second light which is a portion of a first light. The expression "allowing the second structure to overlap the first structure by the offset of the elements" may be construed the second structure being configured or constructed to overlap the first structure by shifting the elements having the second structure to a predetermined offset value. In this way, as the elements are shifted to the predetermined offset value to overlap the first structure, the elements may be arranged in a light transmission area. The elements may each have, for example, a shape of any one of circle, square, rectangle, regular pentagon, regular hexagon, and regular octagon, but are not necessarily limited thereto. The elements may have the same transmittance or different transmittances, along at least one axis of the array. The elements may each have a transmittance greater than or equal to zero (0).

The elements of the additional diffraction member 120 may be offset from the pixels of the first periodic structure of the display 110 to redirect the second light which is a portion of the first light corresponding to the external scene transmitted to the image sensor 140. The expression "being offset" may be construed as having an offset value. The elements of the additional diffraction member 120 may overlap the pixels to attenuate the second light.

For example, the additional diffraction member 120 may be embedded (or integrated) in the display 110 itself or may be configured as a separate layer disposed in front of the display 110. Alternatively or additionally, the additional diffraction member 120 may form a layer between the display 110 and the at least one optical element 130.

The at least one optical element 130 may have optical power and may be arranged between the display 110 and the image sensor 140 as shown in FIG. 1. The at least one optical element 130 may be configured to generate the image of the external scene on the image sensor 140.

The image sensor 140 may be disposed under the screen of the display 110 when viewed from the front of the display 110.

The controller 150 may generate the image of the external scene based on the first light corresponding to the external scene transmitted to the image sensor 140 through the display 110.

The optical system 100 of one or more embodiments may compensate for undesirable diffraction of an incident light introduced by the at least one optical element 130 in the display 110 on a path of the incident light, thereby improving the degradation of image quality that may occur when the camera captures an image of a real scene and compensating for an adverse effect such as blur and artifacts.

Figure 3:
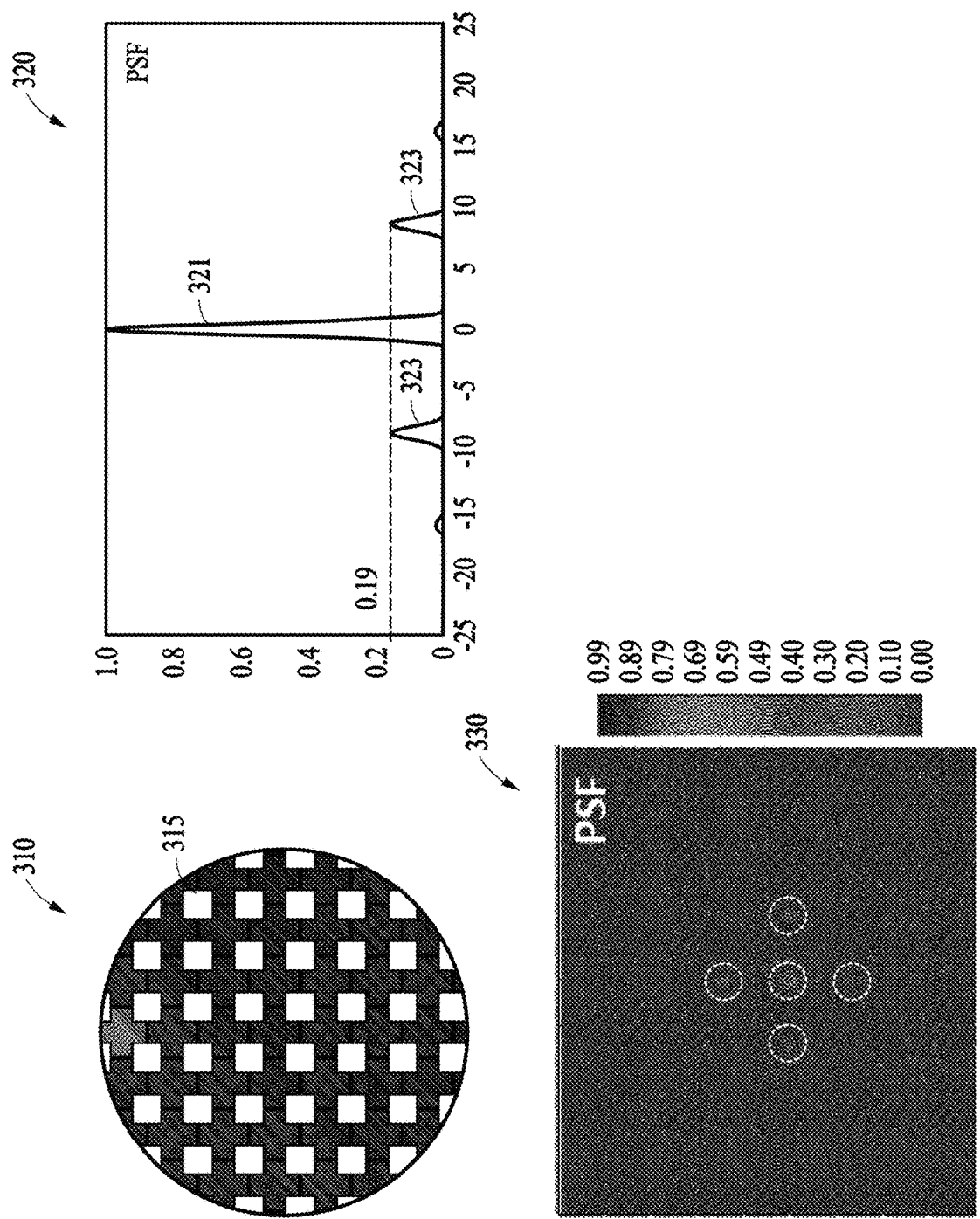
FIG. 3 illustrates a first diffraction peak and a second diffraction peak occurring in response to an overlap between an aperture of a typical under-display camera (UDC) and a structure of pixels of a display.

The second periodic structure of the additional diffraction member 120 may be configured to overlap the first periodic structure of the pixels of the display 110 to reduce the intensity of a diffraction artifact, thereby enhancing the quality of an image generated by the optical system 100. In an example, the first light from the external scene of the real world imaged through the first periodic structure of the pixels may be incident on the display 110 and may be partially transmitted through the display 110. In an example, a portion of the first light (or "incident light") incident on the display 110 may be absorbed or reflected by the first periodic structure of the pixels of the display 110 that is partially transparent. Also, a remaining portion of the incident light transmitted by the display 110 may be diffracted by the first periodic structure of the pixels. Through such a process described above, a first diffraction peak at the center of a point scattering (or spread) function (PSF) as shown in FIG. 3, and second diffraction peaks may be generated. The first diffraction peak at the center may generate an image of a scene, while the second diffraction peaks may be parasitic on the first diffraction peak, degrading the quality of the generated image. As will be described in more detail in examples below, the PSF may be considered an extended blob of an image representing a single point object considered a spatial impulse. In an example, a degree of spreading or blurring of the point object image may be used as a criterion for measuring the quality of an imaging system.

The optical system 100 may evaluate the image of the image sensor 140 using, for example, the PSF. For example, when the optical system 100 does not have a periodic structure including a fully open aperture, a PSF of a lens may have a first diffraction peak that is distinctively expressed at the center and second diffraction peaks that are weakly expressed therearound, according to an aberration correction level.

When the first periodic structure of the pixels of the display 110 is added, for example, as shown in FIG. 3, the weak second diffraction peaks may occur along with the central first diffraction peak of the PSF, and a portion of the energy of the first diffraction peak may be transmitted. Accordingly, each point of a scene may be imaged in the form of a complex structure including a plurality of points having different intensities, and thus blur, doubling, and/or other artifacts may occur. The term "first diffraction peak" may also be referred to as a "main peak" or "central peak." The term "second diffraction peak" may also be referred to as a "parasitic peak" or "additional peak."

For example, a light intensity distribution $E_m$ of an mth second diffraction peak may be described with an equation on a rectangular amplitude grating as expressed in Equation 1 below, for example.

$$E_m(x_2, y_2) = E_0 w^2 \frac{b^2}{d^2} \operatorname{sinc}^2\left(\frac{mb}{d}\right)\left[\left(\frac{w}{\lambda f}\right)^2 \times \operatorname{sinc}^2\left(\frac{x_2 - m\lambda f/d}{\lambda f/w}, \frac{y_2}{\lambda f/w}\right)\right] \quad \text{Equation 1}$$

In Equation 1 above, $E_0$ denotes an intensity of an incident light beam. w denotes an aperture width, and b denotes a width of light transmitting intervals. d denotes a spatial period (or step) of a diffraction grating. m denotes an order of diffraction. λ denotes a wavelength of the incident light beam, and f denotes a focal length of a camera lens. $x_2$, $y_2$ denotes coordinates of a focal plane.

The optical system 100 of one or more embodiments may supplement the partially transparent display 110 using the additional diffraction member 120 to reduce the intensity of a second diffraction peak described above. As such, a diffraction pattern appearing behind the display 110 may be defined as "diffraction" for a complex structure formed by the overlap between the first structure of the pixels of the display 110 and the second structure of the elements of the additional diffraction member 120.

As shown in FIG. 1, when the additional diffraction member 120 is added to the optical system 100, the second structure of the elements of the additional diffraction member 120 may have the same period as a first period of the pixels of the display 110. For example, when the elements of the additional diffraction member 120 are offset by half the period along an X axis and a Y axis of the array of the display 110, the elements of the additional diffraction member 120 may have an additional periodicity direction (e.g., diagonal direction).

A change in the offset described above may affect the PSF such that the second diffraction peaks are generated in the diagonal direction. When such second diffraction peaks are generated, energy may be redistributed among the second diffraction peaks, and thus the light intensity of the second diffraction peaks may be lowered by a factor of approximately 2.8 times. The strength of a suppression effect of the second diffraction peaks may vary depending on, for example, transmission coefficient, size, frequency, and offset of a position of corresponding elements.

Figure 6:
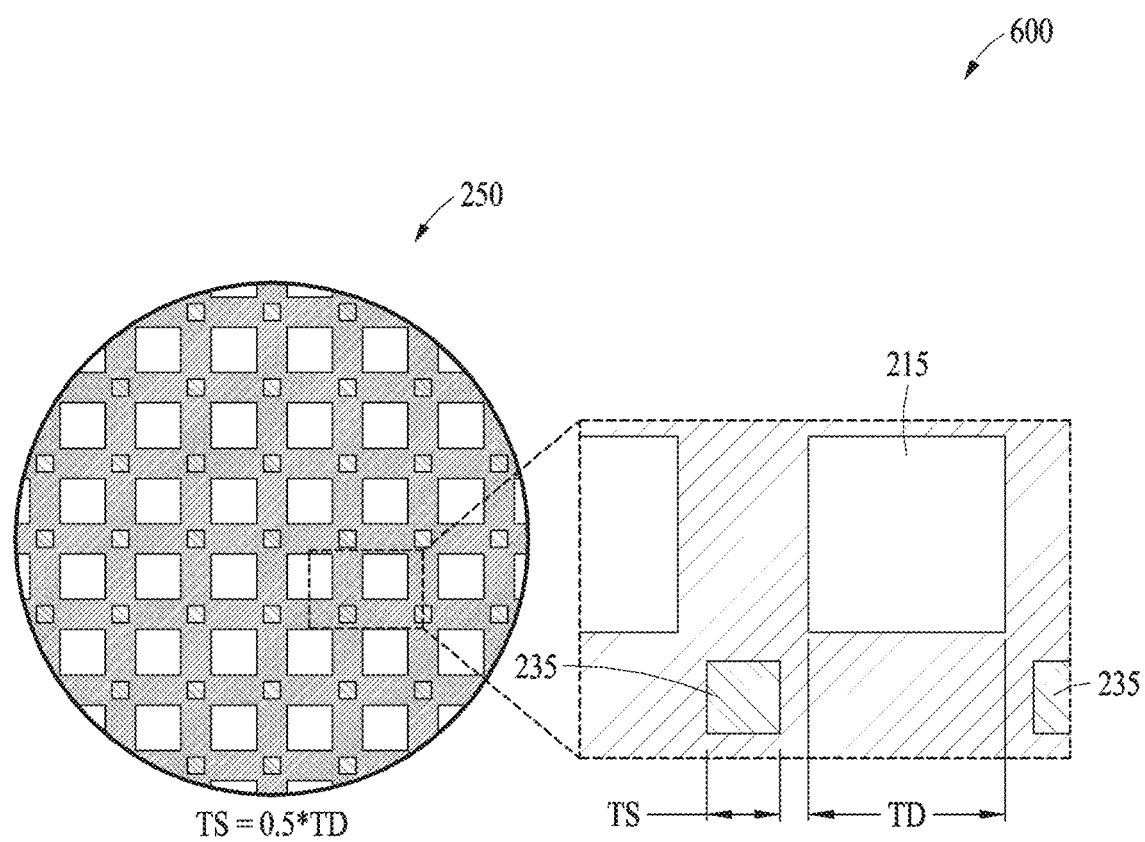
FIG. 6 illustrates examples of the size of elements of an additional diffraction member, in accordance with one or more embodiments.

The suppression effect on the second diffraction peaks may occur the strongest when the transmission coefficient of the elements of the additional diffraction member 120 is zero (0), and for example, as shown in FIG. 6, the size of the elements of the additional diffraction member 120 is 0.5 times, or approximately 0.5 times, the size of the pixels of the display 110.

The suppression effect on the second diffraction peaks may occur in cases, such as, for example, i) the period of the elements of the additional diffraction member 120 is offset by half the period of the pixels of the display 110 along two mutually perpendicular axes (e.g., the X and Y axes), and ii) a second arrangement period (e.g., 1/fs) of the second periodic structure of the elements of the additional diffraction member 120 is the same as a first arrangement period (e.g., 1/fd) of the first periodic structure of the pixels of the display 110. As described above, the strength of the suppression effect on the second diffraction peaks may not depend on a field of view (FOV) of the optical system 100 of the camera.

The optical system 100 of one or more embodiments may improve the quality of a generated image by compensating for undesirable effects by diffraction of an incident light on the pixels of the partially transparent display 110.

Figure 2:
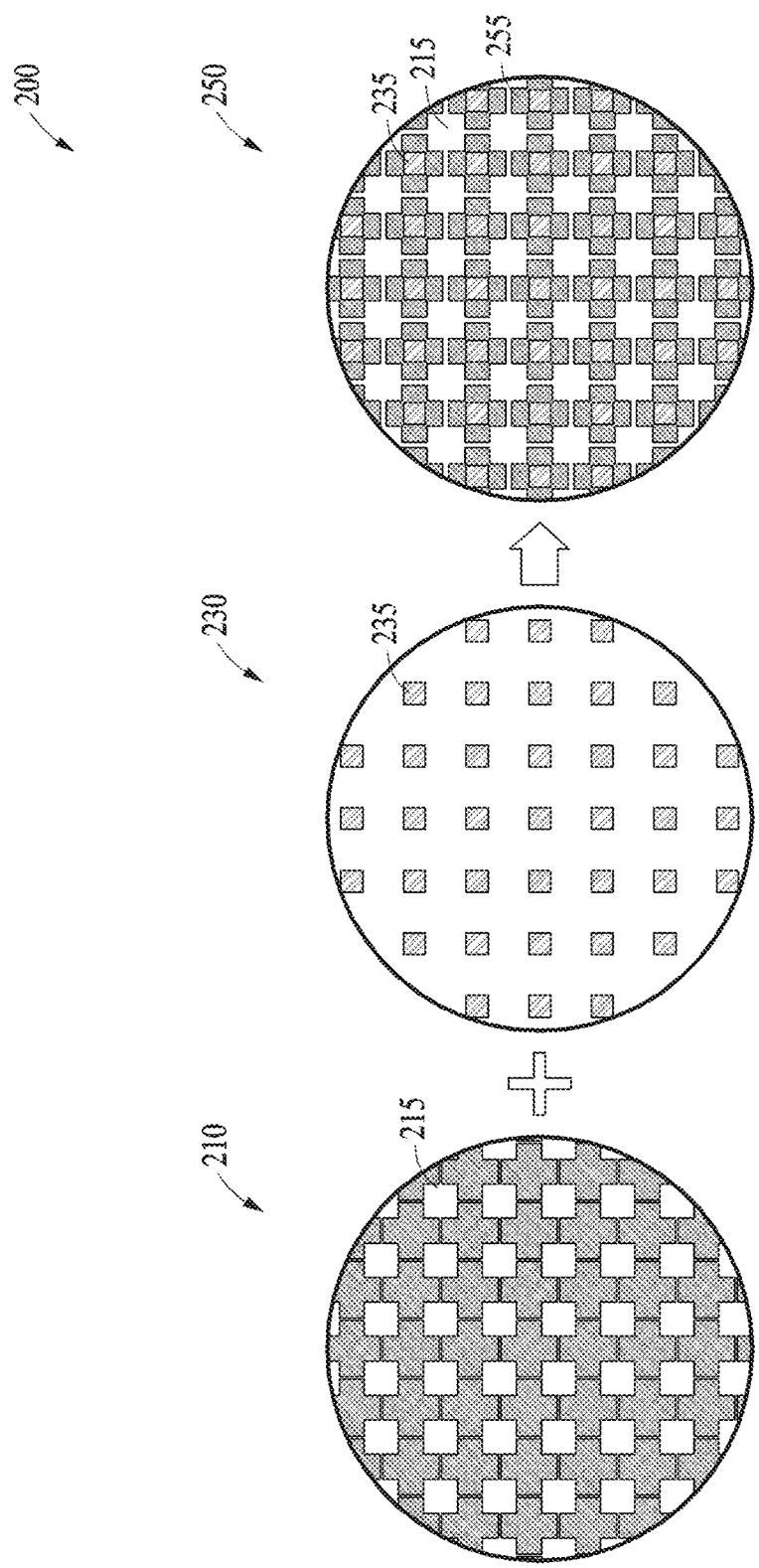
FIG. 2 illustrates an example of an overlap between a structure of pixels of a display and a structure of elements of an additional diffraction member, in accordance with one or more embodiments.

FIG. 2 illustrates an example of an overlap between a structure of pixels of a display and a structure of elements of an additional diffraction member, in accordance with one or more embodiments. Referring to FIG. 2, drawings 210, 230, and 250 show examples of an aperture portion of an optical system (e.g., the optical system 100 of FIG. 1) of a UDC according to one or more embodiments.

The drawing 210 shows pixels 215 of a display which are viewed through the aperture portion of the optical system. The drawing 230 shows elements 235 of an additional diffraction member (e.g., the additional diffraction member 120 of FIG. 1) which are viewed through the aperture portion of the optical system. The drawing 250 shows a result of overlapping the pixels 215 of the display and the elements 235 of the additional diffraction member, viewed through the aperture portion of the optical system.

The pixels 215 may correspond to pixels of a partially transparent display that do not transmit an incident light. In a light transmitted through a structure of a display, there may be attenuation and diffraction.

The elements 235 may correspond to elements of the additional diffraction member, where an array of the elements 235 overlaps an array of the pixels 215 of the display to provide a common structure in which light is diffracted to compensate for (or attenuate) a second diffraction peak.

Areas 255 may be areas where the incident light is substantially completely transmitted by the partially transparent display. The areas 255 may be disposed between the pixels 215, and the elements 235 may be disposed in the areas 255.

The additional diffraction member may be provided to compensate for the second diffraction peak described above. The elements 235 of the additional diffraction member may overlap the pixels 215 of the display to provide a common structure in which light is diffracted to attenuate the second diffraction peak.

The additional diffraction member including an array of the elements 235 that has a second periodic structure may provide a common structure that reduces a diffraction effect that may occur by a first periodic structure of the pixels 215 of the display. This may ensure the quality of an image output from an image sensor of the camera despite the presence of a partially transparent display.

According to one or more embodiments, overlapping the first periodic structure of the pixels 215 of the display and the second periodic structure of the elements 235 of the additional diffraction member may control diffraction artifacts that may occur due to a periodic structure of the display and may also improve the effects of the display and the optical system of the camera.

FIG. 3 illustrates a first diffraction peak and a second diffraction peak occurring in response to an overlap between an aperture of a typical UDC and a structure of pixels of a display.

Referring to FIG. 3, drawing 310 shows an overlap between an aperture of a camera of a typical optical system and pixels 315 of a display, graph 320 shows a first diffraction peak 321 and second diffraction peaks 323 according to a PSF for a structure of the drawing 310, and drawing 330 shows light intensities corresponding to the first diffraction peak 321 and the second diffraction peaks 323. In the drawing 330, the light intensities corresponding to the first diffraction peak 321 and the second diffraction peaks 323 may be indicated in circles in dotted lines.

The PSF may characterize the energy of an incident light based on the generation of an image in an image sensor. In the PSF, the second diffraction peaks 323 that are undesirable may be arranged on an incident light path in the optical system of the camera and may occur due to a first periodic structure of pixels of the display which functions as a diffraction grating in the incident light path.

After light transmitted through the display is diffracted and then passes through the optical system, an image representing the PSF shown in the graph 320 may be generated in the image sensor. The PSF shown in the graph 320 may include the first diffraction peak 321 at the center and the second diffraction peaks 323 on the sides, having lower intensity than the first diffraction peak 321. The first diffraction peak 321 at the center of the graph 320 may contribute to generating a main image of a scene. Also, the second diffraction peaks 323 on the sides of the graph 320 may be generated while being parasitic on the first diffraction peak 321 and may degrade the quality of the image.

Figure 4:
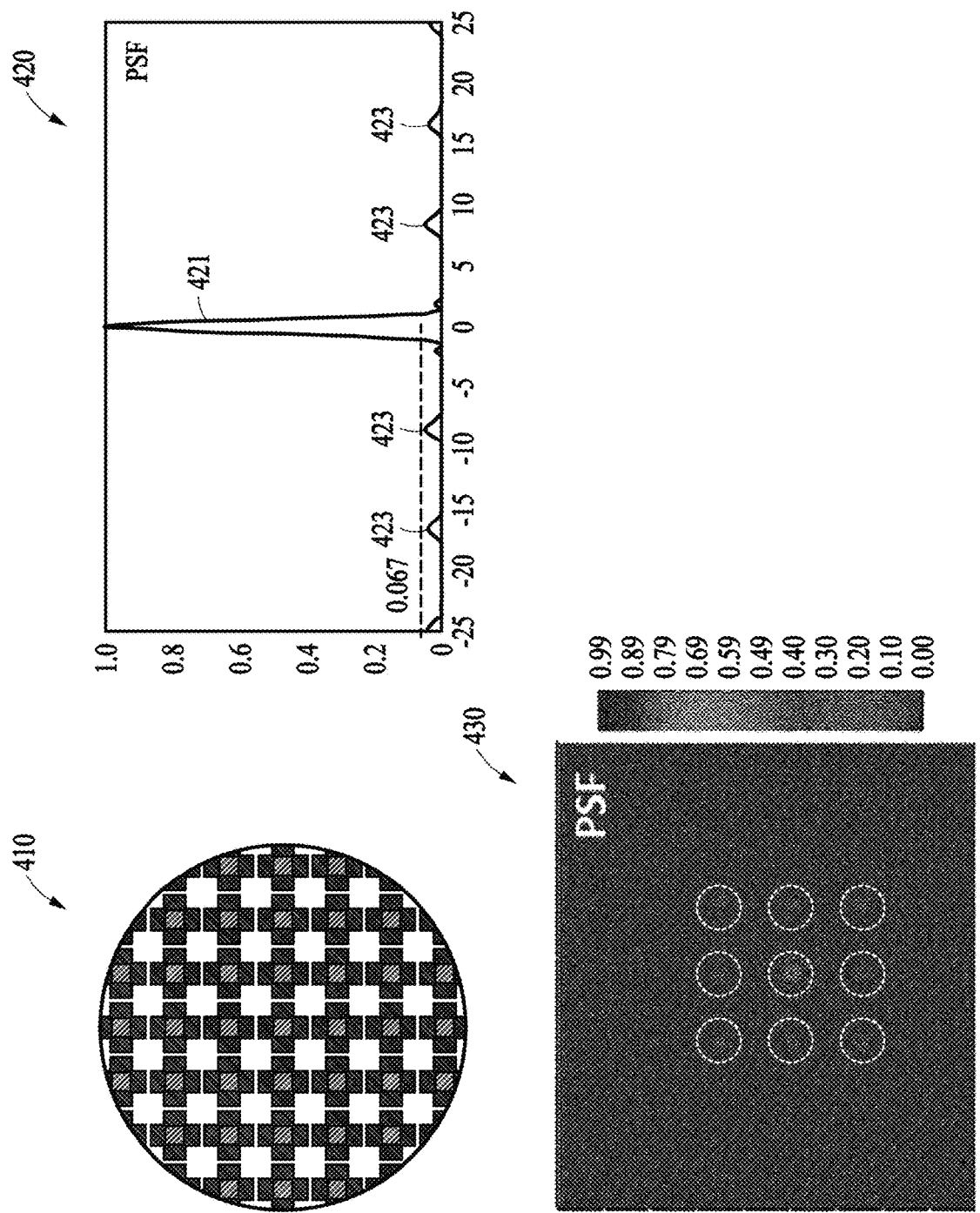
FIG. 4 illustrates a first diffraction peak and a second diffraction peak occurring in response to an overlap among an aperture of a UDC, a structure of elements of an additional diffraction member, and a structure of pixels of a display, in accordance with one or more embodiments.

FIG. 4 illustrates a first diffraction peak and a second diffraction peak occurring in response to an overlap among an aperture of a UDC, a structure of elements of an additional diffraction member, and a structure of pixels of a display, in accordance with one or more embodiments. Referring to FIG. 4, drawing 410 shows an overlap among an aperture of a camera of an optical system, a structure of elements of an additional diffraction member, and a structure of pixels of a display according to one or more embodiments, graph 420 shows a first diffraction peak 421 and diagonal diffraction peaks 423 according to a PSF for a structure of the drawing 410, and drawing 430 shows light intensities corresponding to the first diffraction peak 421 and the diagonal diffraction peaks 423.

In the drawing 430, the light intensities corresponding to the first diffraction peak 421 and the diagonal diffraction peaks 423 may be indicated in circles in dotted lines. In the drawing 430, light intensities corresponding to the diagonal diffraction peaks 423 may be represented by four points in a diagonal form in which they face each other, unlike the drawing 330 of FIG. 3.

The additional diffraction member of one or more embodiments may introduce the additional diagonal diffraction peaks 423, and may redistribute the energy from the second diffraction peaks 323 shown in the drawing 320 of FIG. 3 to the diagonal diffraction peaks 423 shown in FIG. 4. Through the energy redistribution, the additional diffraction member of one or more embodiments may reduce the intensities of the second diffraction peaks 323 in an initial diffraction pattern generated by the array of the pixels of the display (e.g., refer to the drawing 320 of FIG. 3) to that shown in the diagonal diffraction peaks 423 of FIG. 4, thereby reducing a maximum intensity of the undesirable second diffraction peaks 323.

For example, when the size of each element of the additional diffraction member is 0.5 times or 0.5 (±0.1) times the size of the pixels, the second diffraction peaks may be most strongly compensated for (suppressed). As shown in the drawing 410, in a periodic structure in which the elements of the additional diffraction member and the pixels of the display overlap, an intensity of a second diffraction peak after light diffraction may be reduced by approximately 2.8 times from 0.19 to 0.067.

The PSF may explain a response of the optical system when an image of a point (light) source or point object is generated. An ideal optical system may project a point source or point object onto a plane (e.g., a plane of an image sensor) on which an image is generated in the form of a spot, instead of a point, and may have a specific intensity distribution that may be explained by an inverse Fourier transform (IFT) of a pupil function, as expressed in Equation 2 below, for example.

$$Psf(x, y) = |F^{-1}[f(\rho_x, \rho_y)]|^2 \qquad \text{Equation 2}$$

In Equation 2, Psf denotes a PSF, and x, y denotes coordinates on a plane of an image sensor. $F^{-1}$ denotes an IFT, and f denotes a pupil system of an optical system. $p_x$, $p_y$ denotes coordinates on a plane of the pupil of the optical system.

The size and shape of the PSF may define a resolution of the optical system. Between two given points of a point source or point object, there may be a limit visible angle that may be resolved, that is, distinguishable from each other. The limit visible angle may also be referred to as a "minimum visible angle."

The limit visible angle may vary according to the number of the pupil function f of the optical system and a degree of aberration correction of the optical system.

The effects of the PSF on a configuration of the optical system may be described with a convolution function between two functions (e.g., the PSF and the intensity distribution function) expressed in Equations 3 and 4 below, for example.

$$H(x, y) = \int\int W(x_0, y_0) Psf(x - x_0, y - y_0) dx_0 dy_0 \qquad \text{Equation 3}$$

$$H = Psf \otimes W \qquad \text{Equation 4}$$

In the foregoing equations, w denotes a function of an object. $x_0$, $y_0$ denotes coordinates on a plane of the object. x, y denotes coordinates on a plane of an image sensor. Psf denotes a PSF.

The additional diffraction member may be provided as a part of the structure of the elements of the display (i.e., be integrated into the structure of the display) in an area corresponding to an aperture of a UDC, or be attached/applied, by being printed out, to a surface of the display on a side facing an optical element of the UDC (i.e., forming a layer on the surface of the display).

The efficiency of the additional diffraction member may depend on the size of the elements of the additional diffraction member and may also be related to a position between the elements and the pixels of the partially transparent display.

For example, a frequency fs of a second periodic structure of the elements of the additional diffraction member may be the same as a frequency fd of the pixels of the display. That is, a second arrangement period (1/fs) of the second periodic structure of the elements may be the same as a first arrangement period (1/fd) of the first periodic structure of the pixels. Alternatively, the second arrangement period (1/fs) of the second periodic structure of the elements may be 0.1 times the first arrangement period (1/fd) of the first periodic structure of the pixels.

The elements of the additional diffraction member may be shifted by an offset of half (0.5 times) a first arrangement period PD of the first periodic structure of the pixels of the display, with respect to the structure of the pixels of the display, and may be arranged accordingly.

The first arrangement period PD of the first periodic structure of the pixels of the display may be equal to a distance between the centers of adjacent elements in the second periodic structure of the elements of the additional diffraction member.

In addition, the frequency fs of the elements of the additional diffraction member and the frequency fd of the pixels of the display may have a relationship as expressed in Equation 5 below, for example.

$$fs = (0.9 \div 1.1) * fd \qquad \text{Equation 5}$$

For example, the additional diffraction member may be implemented as an integral part in the structure of the pixels of the display. The additional diffraction member may be overlaid as a separate layer on a side of the display facing an optical element of the camera as described above. Alternatively, the additional diffraction member may be implemented as an additional part of the display at any position between a cover slip of at least one optical element of the camera and a first optical element. In this example, when the additional diffraction member is implemented as the additional part of the display, the additional diffraction member may be formed of, for example, glass such as N-BK7, polymer film such as polycarbonate (PC) film, or other transparent materials.

Figure 5:
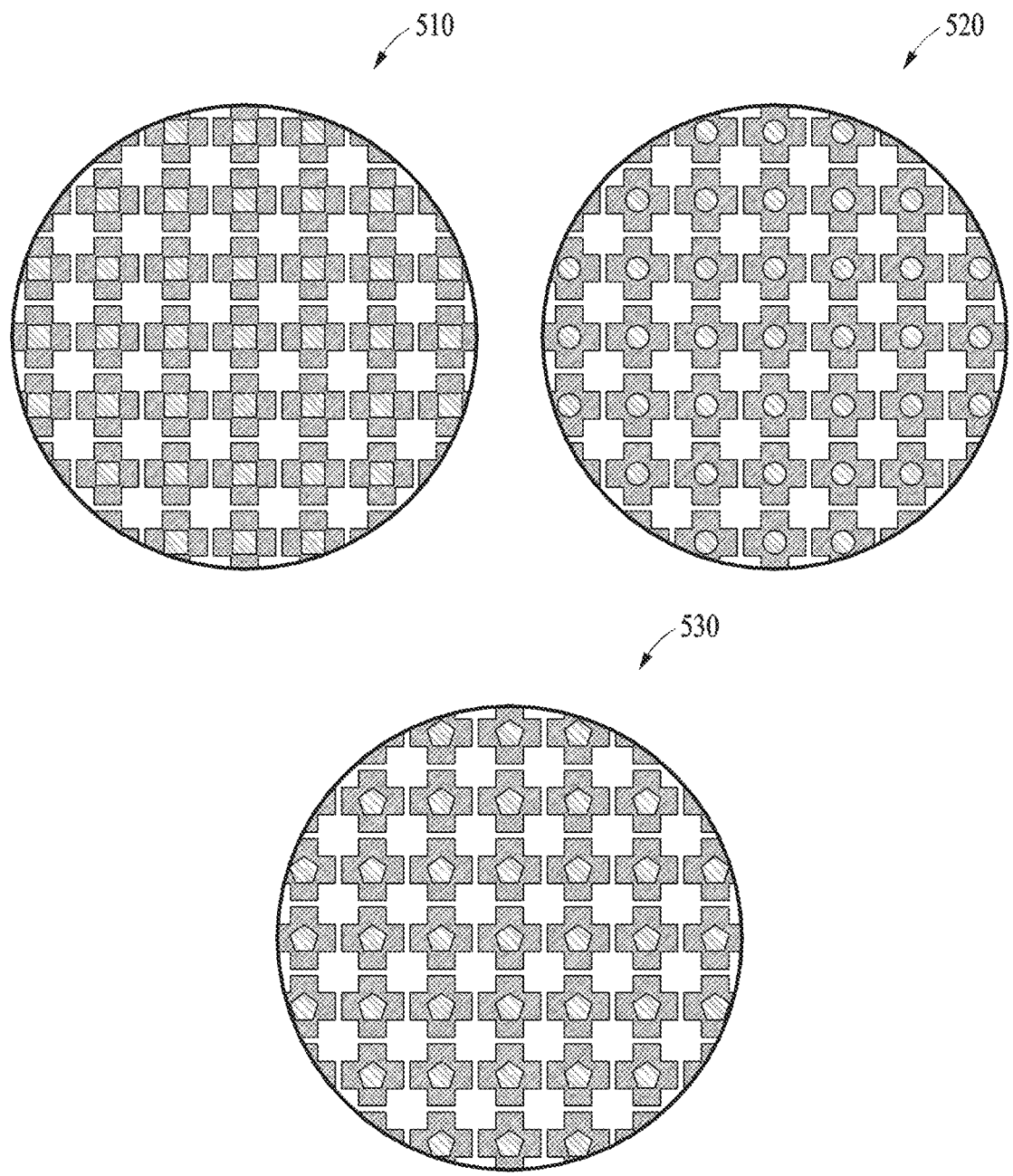
FIG. 5 illustrates examples of different geometries of elements of an additional diffraction member, in accordance with one or more embodiments.

FIG. 5 illustrates examples of different geometries of elements of an additional diffraction member, in accordance with one or more embodiments. Referring to FIG. 5, each of elements of an additional diffraction member of one or more embodiments may have a square shape as shown in drawing 510, a circular shape as shown in drawing 520, or a regular pentagonal shape as shown in drawing 530.

An optimal shape and size of the additional diffraction member may vary depending on the size and/or pitch of pixels of a display. The elements of the additional diffraction member may have, for example, a circular, square, rectangular, regular pentagonal, regular hexagonal, or regular octagonal shape, but are not necessarily limited thereto. Each of the elements of the additional diffraction member may have a transmittance ($\tau \geq 0$) greater than or equal to zero (0), for example.

The transmittance of the elements of the additional diffraction member may be consistent throughout an entire area (e.g., some area of the surface of a partially transparent display where the optical system of the camera is configured to receive an incident light from a displayed scene) of an "aperture" of the optical system of the camera. Depending on one or more embodiments, the transmittance of the elements of the additional diffraction member may be different for different areas of the aperture.

FIG. 6 illustrates examples of the size of elements of an additional diffraction member, in accordance with one or more embodiments. Referring to FIG. 6, drawing 600 shows an example size of elements of an additional diffraction member compared to the size of pixels of a display according to one or more embodiments.

For example, referring to drawing 250, when the size TS of an element 235 of the additional diffraction member is approximately 0.5 times (e.g., TS=0.5*TD) the size TD of a pixel 215 according to at least one of two mutually perpendicular axes (e.g., X or Y axis) in an array structure of the display, the optical system 100 of one or more embodiments may maximally suppress second diffraction peaks described above. That is, when the size TD of one pixel 215 is double the size TS of one element 235, the optical system of one or more embodiments may maximize the suppression of the second diffraction peaks to maximize the quality of an image generated in the camera and optimize the optical system of the camera for all displays.

Figure 7:
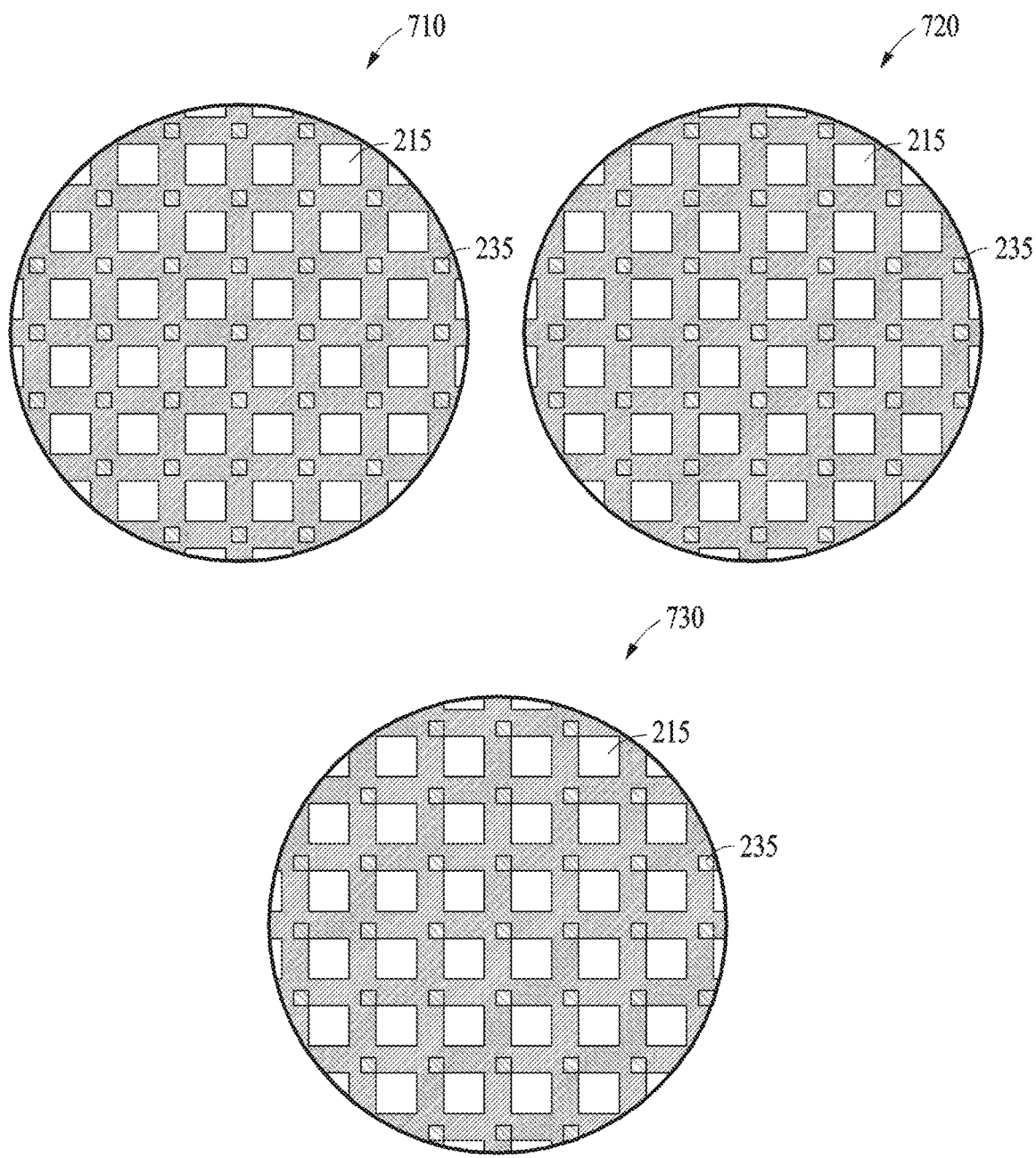
FIG. 7 illustrates examples of different offset values of elements of an additional diffraction member, in accordance with one or more embodiments.

FIG. 7 illustrates examples of different offset values of elements of an additional diffraction member, in accordance with one or more embodiments. Referring to FIG. 7, drawings 710, 720, and 730 show example results of overlapping elements 235 of an additional diffraction member having different offsets, with respect to pixels 215 of a display according to one or more embodiments.

The drawing 710 shows an example case in which the elements 235 of the additional diffraction member are shifted by an offset of a first period PD with respect to the pixels 215, along at least one of two mutually perpendicular axes (e.g., X or Y axis) in a periodic structure of the display.

The drawing 720 shows an example case in which the elements 235 of the additional diffraction member are shifted by an offset of at least 0.1 period PD with respect to the pixels 215, along at least one of the two mutually perpendicular axes (e.g., X or Y axis) in the periodic structure of the display.

The drawing 730 shows an example case in which the elements 235 of the additional diffraction member are shifted by an offset of 0.5 times an arrangement period PD of the pixels 215, along the X axis and the Y axis with respect to elements of a first periodic structure of the pixels 215 of the display. The optical system of one or more embodiments may maximally suppress second diffraction peaks by offsetting the elements 235 of the additional diffraction member by 0.5 period PD, for example, (Shift_X=0.5*PD; Shift_Y=0.5*PD) on the X axis and the Y axis.

Figure 8:
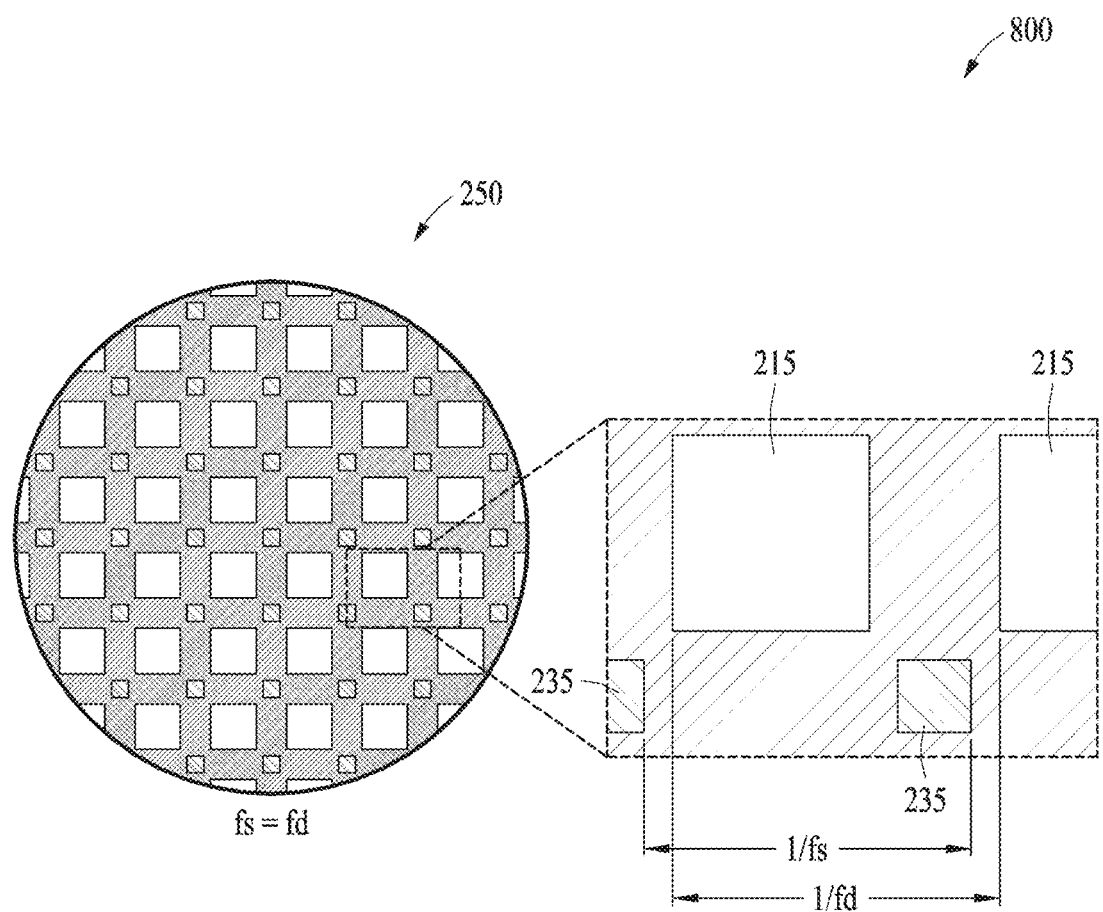
FIG. 8 illustrates an example period in which elements of an additional diffraction member are arranged, in accordance with one or more embodiments.

FIG. 8 illustrates an example arrangement period of elements of an additional diffraction member, in accordance with one or more embodiments. Referring to FIG. 8, drawing 800 shows an arrangement period between pixel(s) 215 of a display and element(s) 235 of an additional diffraction member when the additional diffraction member and the display overlap as shown in drawing 250 according to one or more embodiments.

According to one or more embodiments, an optical system of one or more embodiments may maximally suppress second diffraction peaks by matching (i.e., fs=fd) a frequency fs of the element(s) 235 of the additional diffraction member to a frequency fd of the pixel(s) 215 of the display along at least one of mutually perpendicular axes (e.g., X or Y axis). That is, the optical system may maximally suppress the second diffraction peaks by setting a second arrangement period (1/fs) of a periodic structure of the element(s) 235 to be the same as a first arrangement period (1/fd) of a first periodic structure of the pixel(s) 215.

Figure 9:
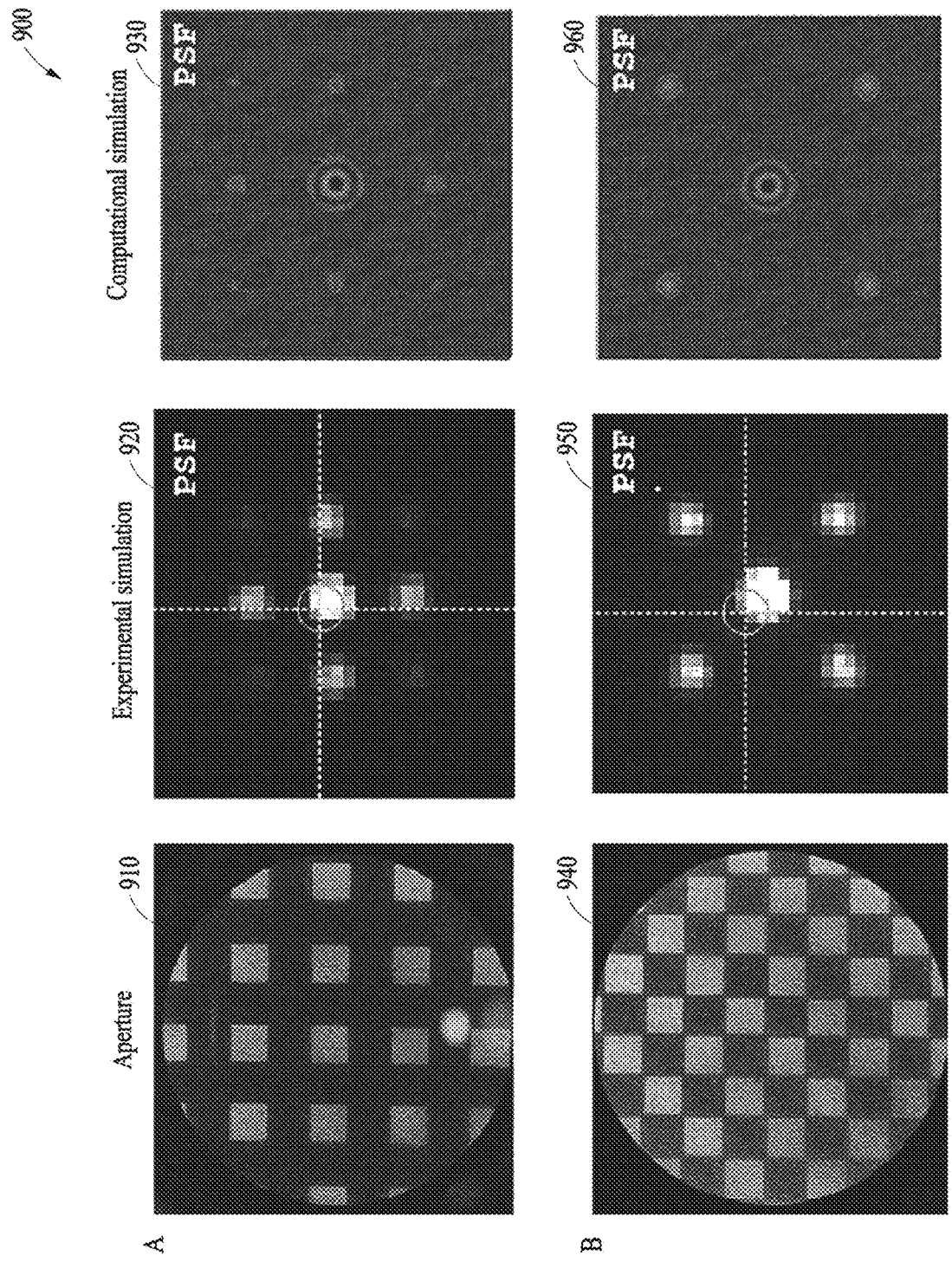
FIG. 9 illustrates examples of test results obtained from a first model of a typical UDC and a second model of a UDC of one or more embodiments.

FIG. 9 illustrates examples of test results obtained from a first model of a typical UDC and a second model of a UDC of one or more embodiments. Referring to FIG. 9, there are views (e.g., view A 910 and view B 940) of apertures respectively corresponding to a first model of a typical UDC having a partially transparent display on an incident light path and a second model of a UDC having a partially transparent display and an additional diffraction member according to one or more embodiments, and graphs 920 and 950 of PSFs for experimental simulation on the first model corresponding to view A 910 and the second model corresponding to view B 940, and graphs 930 and 960 of PSFs for computational simulation on the first model and the second model.

The view A 910 may correspond to a typical optical system in which pixels of a display have a periodic structure and an additional diffraction member is not included. The view B 940 may correspond to an optical system including pixels of a display having a periodic structure and an additional diffraction member having a periodic structure.

In FIG. 9, the graph 920 shows a PSF for experimental simulation corresponding to the view A 910, and the graph 930 shows a PSF for computational simulation corresponding to the view A 910.

In addition, in FIG. 9, the graph 950 shows a PSF for experimental simulation corresponding to the view B 940, and the graph 960 shows a PSF for computational simulation corresponding to the view B 940.

In the graph 930 corresponding to the view A 910, second diffraction peaks on the sides may have a greater intensity than a diagonal peak. In the graph 960 corresponding to the view B 940, energy redistribution from the second diffraction peaks to the diagonal diffraction peak may be noticeable. Based on this, it may be verified that an experimental result coincides with a computational result. Through the resulting graphs 920 and 950 of the experimental simulation and the resulting graphs 930 and 960 of the computational simulation shown in FIG. 9, it may be verified that the presence of the additional diffraction member in the optical system of one or more embodiments contributes to the energy redistribution of the second diffraction peaks and the reduction in the intensity of the second diffraction peaks.

The graphs of FIG. 9 may correspond to the results of simulations performed by applying various modifications to the additional diffraction member to experimentally verify a suppression (or compensation) effect on the second diffraction peaks of the PSF. For example, an incident light source may be implemented in the form of a light-emitting diode (LED) having a wavelength of 530+17 nanometers (nm) and an LED having an optical fiber output. In an example, the presence of the optical fiber output may not be essential because an output of light using an optical fiber simulates a point (light) source.

In one or more embodiments, a collimating lens having an effective focal length (EFL) of 19 mm may be used. A front focal plane of the collimating lens may be aligned with an optical fiber output of an LED light source to generate a parallel ray beyond the lens, simulating a point (light) source at a considerable distance from the camera, in the most common example of image capturing. Then, a dichroic filter having a wavelength of 532+2 nm that narrows the spectrum of the LED light source from 34 nm (range 513 . . . 547 nm) to 4 nm (range 530 . . . 534 nm) may be used in an experimental array to bring the experimental conditions closest to the initial data used in computation, to remove the noise of adjacent wavelengths and increase the measurement accuracy.

In addition, in one or more embodiments, an additional diffraction member to which various periodic structures and optical elements of a UDC in the form of a "doublet" of a lens having an EFL of 25 mm may be used. Referring to FIG. 9, two modifications—an experimental model and a computational model—may be simulated.

For example, as in the view A 910, in the case of an optical system having a similar periodic structure to the structure of the display without having an additional diffraction member in an aperture of the optical system of the camera, the size of the pixels of the display may have a value of ½ of a period of a first periodic structure of the pixels.

In addition, as in the view B 940, in the case of an optical system having a similar periodic structure to the structure of the display, with an additional diffraction member being coupled to an aperture of the optical system of the camera, the optical system of the camera may have the following characteristics.

The size of the pixels of the display may be equal to half (½) the period of the pixels. The size of elements of the additional diffraction member may be the same as the size of the pixels of the display. A second arrangement period of the elements of the additional diffraction member may be the same as a first arrangement period of the pixels of the display. Also, an offset of the elements of the additional diffraction member may be equal to half (½) the period of the pixels of the display.

Figure 10:
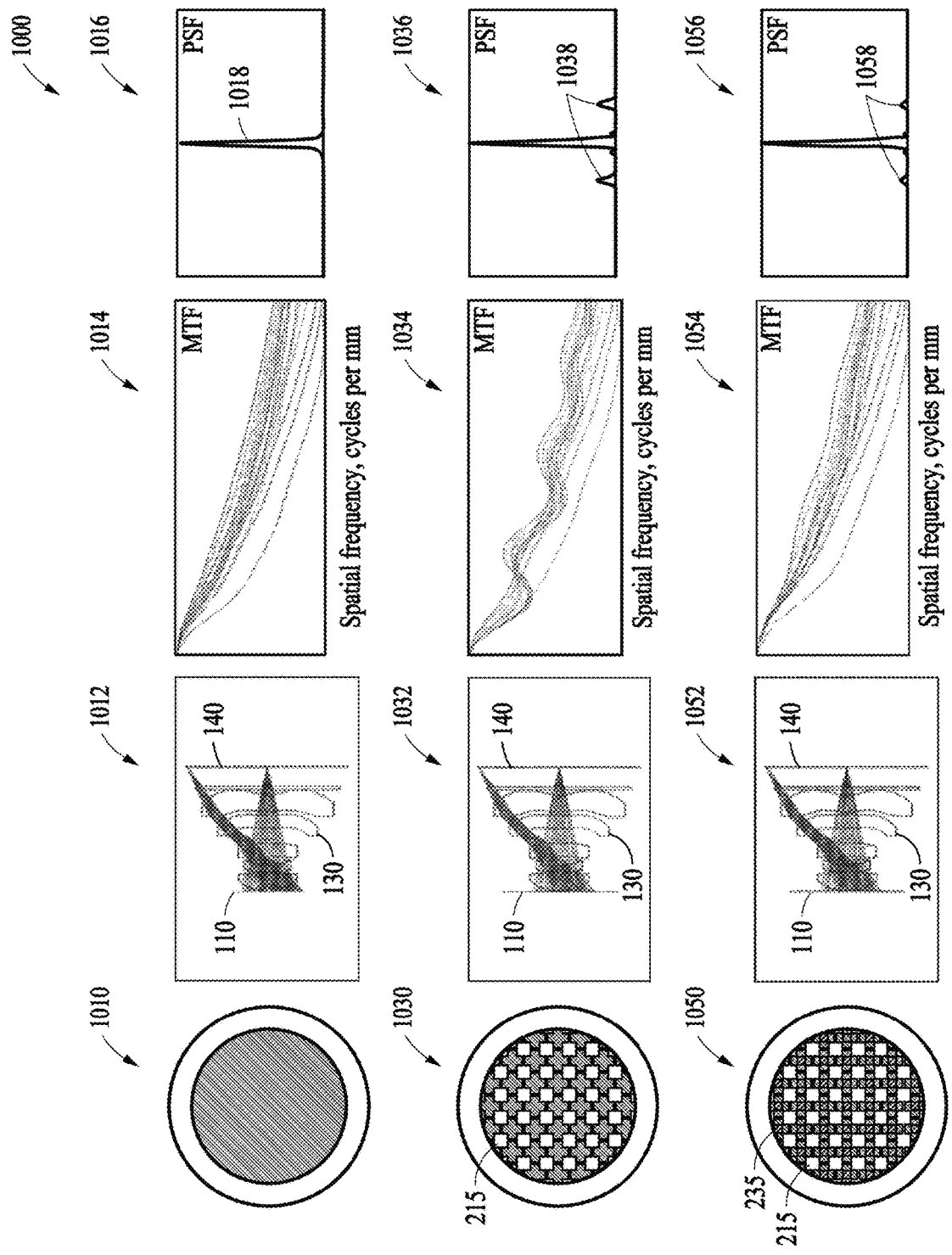
FIG. 10 illustrates examples of test results obtained from a first model of a typical UDC, a second model, and a third model of a UDC of one or more embodiments.

FIG. 10 illustrates examples of test results obtained from a first model of a typical UDC, a second model, and a third model of a UDC of one or more embodiments. Referring to FIG. 10, there are views 1010, 1030, and 1050 respectively corresponding to the first model, the second model, and the third model, drawings 1012, 1032, and 1052 of optical systems respectively corresponding to the models, modulation transfer function (MTF) graphs 1014, 1034, and 1054 respectively corresponding to the views 1010, 1030, and 1050, and PSF graphs 1016, 1036, and 1056 respectively corresponding to the views 1010, 1030, and 1050.

The view 1010 may represent a test result corresponding to an optical system (or the first model) with an aperture open without a partially transparent display on an incident light path.

The view 1030 may represent a test result corresponding to an optical system (or the second model) having a partially transparent display on an incident light path without an additional diffraction member. The view 1050 may represent a test result corresponding to an optical system (or the third model) having a partially transparent display and an additional diffraction member on an incident light path.

An MTF may correspond to a parameter used to evaluate the performance of a lens. Through an MTF graph, the capability of the lens to show, as an image, the contrast of a sample using a spatial frequency (resolution) may be measured. In an example, the spatial frequency may represent the number (lp/mm) of line pairs (i.e., one black line and one white line) per millimeter.

The MTF graph 1014 and the PSF graph 1016 may correspond to the view 1010. The MTF graph 1034 and the PSF graph 1036 may correspond to the view 1030. The MTF graph 1054 and the PSF graph 1056 may correspond to the view 1050.

The view 1010 may show a case in which the aperture is opened in the optical system without the partially transparent display (e.g., the display 110) on an incident light path, as shown in the drawing 1012. In the MTF graph 1014 corresponding to the view 1010, it may be verified that there is no vibration. This characteristic may be represented by a first diffraction peak 1018 at the center of the PSF graph 1016.

The view 1030 may show a case in which the aperture is opened in the optical system having the partially transparent display 110 on an incident light path, as shown in the drawing 1032. In the MTF graph 1034 corresponding to the view 1030, it may be verified that there is vibration. Such vibration may occur due to a periodic structure of pixels (e.g., the pixels 215) of the partially transparent display 110 on the incident light path, as shown in the drawing 1032. The vibration in the MTF graph 1034 may be represented by second diffraction peaks 1038 that are prominent on the sides of the PSF graph 1036.

The view 1050 may show a case in which the aperture is opened in the optical system having the partially transparent display 110 and an additional diffraction member on an incident light path, as shown in the drawing 1052. In the MTF graph 1054 corresponding to the view 1050, it may be verified that the vibration is significantly reduced. The significantly reduced vibration may be because the second diffraction peaks 1038 are attenuated by the additional diffractive element of the optical system of one or more embodiments. The significantly reduced vibration in the MTF graph 1054 may be represented by second diffraction peaks 1058 that are significantly attenuated in the PSF graph 1056.

The efficiency of the additional diffraction member may vary depending on the size of elements (e.g., the elements 235) having a second periodic structure and an offset relative to the pixels 215 of the display having a first periodic structure.

An optimal suppression effect may be achieved when the elements 235 of the additional diffraction member of the optical system of one or more embodiments are used, the size of the elements 235 of the additional diffraction member is (½+0.05) times the size of the pixels 215 of the display, and the elements 235 of the additional diffraction member are shifted and arranged by an offset of 0.5 times a first arrangement period of the first structure of the pixels 215 of the display, along the mutually perpendicular X and Y axes.

In the third model using the additional diffraction member as shown in the view 1050, the strength of the suppression effect on second diffraction peaks may vary depending on the size of the elements 235 of the additional diffraction member. For example, as the size of the elements 235 of the additional diffraction member increases from 1/6.4 times to ½ times the period of the first structure of the pixels 215 of the display, the energy of the second diffraction peaks may be transferred from second diffraction peaks (e.g., the second diffraction peaks 323 of FIG. 3) to diagonal diffraction peaks (e.g., the diagonal diffraction peaks 423 of FIG. 4). In this way, the optimal size of the elements 235 of the additional diffraction member may amplify the diagonal diffraction peaks to optimally attenuate the second diffraction peaks on the sides, while allowing the light intensity of the elements 235 of the additional diffraction member to be maintained relatively low compared to a first diffraction peak corresponding to an image point.

According to one or more embodiments, using an additional diffraction member overlaid on a display may suppress second diffraction peaks and may thus enhance image quality. In addition, according to one or more embodiments, integrally integrating the additional diffraction member with the structure of the display, immediately printing the additional diffraction member on the display, or forming the additional diffraction member to be thin, such as in a glass plate or a polymer film, may reduce the overall thickness of the optical system. Additionally, according to one or more embodiments, it is possible to design a "full screen" display of an electronic device using a UDC without hiding, beneath the surface of a display, a separate portion of the front surface allocated for an aperture of the camera and the camera itself.

Figure 11:
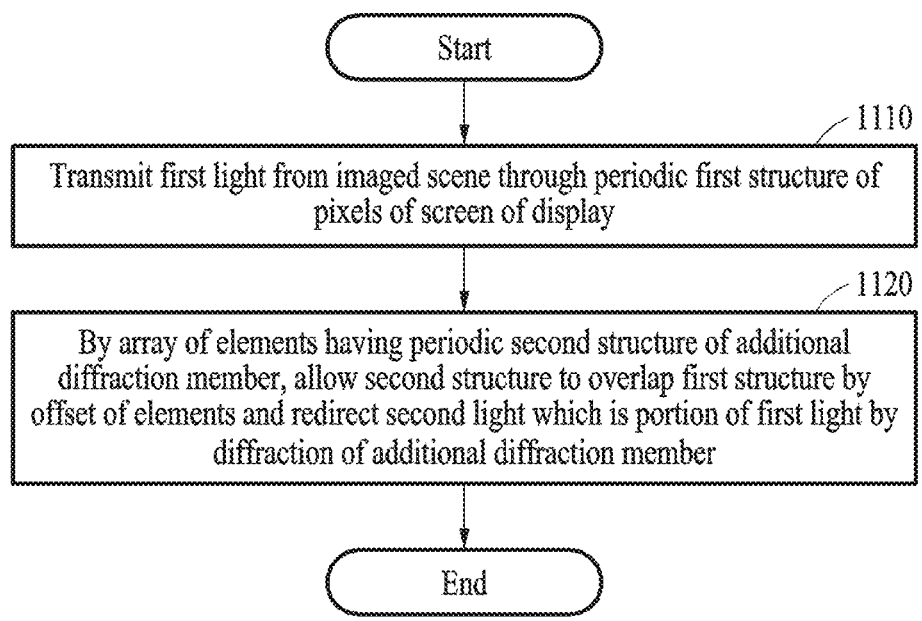
FIG. 11 illustrates a flowchart of an example method of operating an optical system, in accordance with one or more embodiments.

FIG. 11 illustrates a flowchart of an example method of operating an optical system, in accordance with one or more embodiments. Operations to be described hereinafter may be performed sequentially, but not necessarily performed sequentially. For example, the order of the operations may be changed and at least two of the operations may be performed in parallel.

Referring to FIG. 11, a method of operating an optical system of a UDC, more specifically, a method of compensating for diffraction in an optical system of a UDC according to one or more embodiments will be described.

In operation 1110, the optical system may transmit a first light from an imaged scene through a first periodic structure of pixels of a display. The optical system may transmit the first light from the imaged scene through a pixel structure of a partially transparent display.

In operation 1120, the optical system may allow, by an array of elements having a second periodic structure of an additional diffraction member, the second structure to overlap the first structure by an offset of the elements, and may redirect a second light which is a portion of the first light by diffraction of the additional diffraction member. The elements of the additional diffraction member may overlap the pixels to attenuate the second light. The optical system may shift the elements, with respect to the pixels, by 0.5 times a first arrangement period of the first structure, along at least one axis of the array.

Figure 12A:
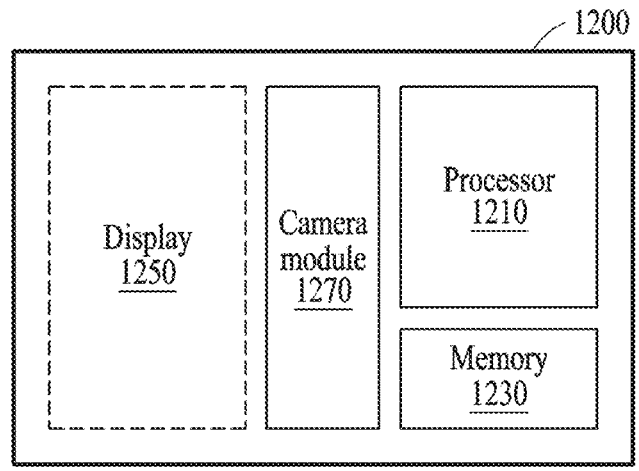
FIG. 12A illustrates a block diagram of an example electronic device, in accordance with one or more embodiments.

FIG. 12A illustrates a block diagram of an example electronic device, in accordance with one or more embodiments. Referring to FIG. 12A, an electronic device 1200 may include a processor 1210 (e.g., one or more processors), a memory 1230 (e.g., one or more memories), a display 1250, and a camera module 1270. The processor 1210 may be operatively connected to the memory 1230, the display 1250, and the camera module 1270. For example, the processor 1210 may control the memory 1230, the display 1250, and the camera module 1270. The camera module 1270 may include components of the optical system 100 described above with reference to FIG. 1.

The processor 1210 may transmit a first light from an imaged external scene through a first structure of pixels, and shift elements based on an offset to overlap a second structure and the first structure at regular intervals.

The memory 1230 may store data related to operations of the electronic device 1200. For example, the memory 1230 may store data related to an image obtained using the camera module 1270. For another example, the memory 1230 may store data on a light source obtained using the camera module 1270. For another example, the memory 1230 may be or include a non-transitory computer-readable storage medium instructions that, when executed by the processor

1210, configure the processor 1210 to perform any one, any combination, or all of operations and/or methods of the processor 1210.

The display 1250 may visually provide data to the outside of the electronic device 1200. For example, the processor 1210 of the electronic device 1200 may visually provide image data obtained through the camera module 1270 to an external user using the display 1250.

The display 1250 may include a pixel layer (not shown) including pixels of a first periodic structure in an array form. For example, the display 1250 may visually provide image data including color data to an external user, using the pixel layer.

The display 1250 may include a shielding structure (not shown). For example, the display 1250 may include a shielding structure having a shape corresponding to a shape of the pixel layer. In an example, the display 1250 may be or include the display 110 of FIG. 1.

Figure 12B:
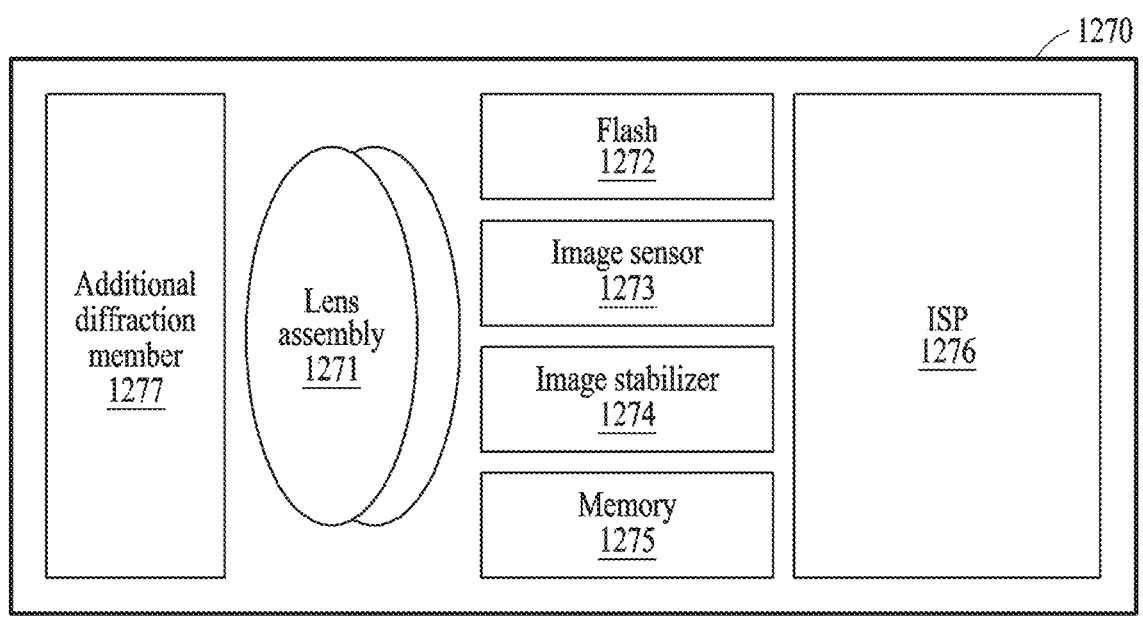
FIG. 12B illustrates a block diagram of an example camera module, in accordance with one or more embodiments.

The camera module 1270 may include an image sensor 1273, at least one optical element (e.g., a lens assembly 1271 of FIG. 12B), a controller (e.g., of an image signal processor (ISP) of FIG. 12B), and an additional diffraction member 1277. The image sensor 1273 may be disposed under a screen of the display 1250. The at least one optical element may be disposed between the display 1250 and the image sensor 1273 and form an image of an external scene on the image sensor 1273. The controller may generate an image based on a first light corresponding to an external scene transmitted to the image sensor 1273 through the display 1250. The additional diffraction member 1277 may be provided in the form of an array of elements having a second periodic structure, and allow the second structure to overlap the first structure by an offset of the elements and redirect a second light which is a portion of the first light. A detailed configuration of the camera module 1270 will be described below with reference to FIG. 12B. In an example, the image sensor 1273 may be or include the image sensor 140 of FIG. 1. In an example, the additional diffraction member 1277 may be or include the additional diffraction member 120 of FIG. 1.

The camera module 1270 may be arranged to detect an external scene through the display 1250. For example, the camera module 1270 may be disposed in an internal space of the electronic device 1200 to contact an external scene through a transmission area formed in the display 1250.

According to one or more embodiments, an area of the display 1250 facing the camera module 1270 may be a portion of an area that displays content and may be formed as a transmission area having a predetermined transmittance. The transmission area may be formed to have a transmittance ranging from approximately 5% to 20%. For example, the transmission area may include an area overlapping an effective area (e.g., a FOV area) of the camera module 1270 through which a light for generating an image formed by the image sensor 1273 passes. For example, the transmission area of the display 1250 may include an area having a lower pixel density and/or wiring density than a surrounding area. For example, the transmission area may replace the opening described above. For example, the camera module 1270 may include a UDC.

The memory 1230 may store various information generated in the processing process of the processor 1210 described above. In addition, the memory 1230 may store various data and programs. The memory 1230 may include, for example, a volatile memory or a non-volatile memory. The memory 1230 may include a high-capacity storage medium such as a hard disk to store various data.

In addition, the processor 1210 may perform at least one of the methods described above with reference to FIGS. 1 through 12B or an algorithm corresponding to at least one of the methods. The processor 1210 may be a hardware-implemented data processing device having a physically structured circuit for executing desired operations. The desired operations may include, for example, codes or instructions included in a program. The processor 1210 may be implemented as, for example, a central processing unit (CPU), a graphics processing unit (GPU), or a neural network processing unit (NPU). The hardware-implemented data processing device may include, for example, a microprocessor, a CPU, a processor core, a multi-core processor, a multiprocessor, an application-specific integrated circuit (ASIC), and a field-programmable gate array (FPGA).

The processor 1210 may execute the program and control the electronic device 1200. A code of the program executed by the processor 1210 may be stored in the memory 1230.

FIG. 12B illustrates a block diagram of an example camera module, in accordance with one or more embodiments. According to one or more embodiments, the camera module 1270 may include the lens assembly 1271, a flash 1272, an image sensor 1273, an image stabilizer 1274, a memory 1275 (e.g., a buffer memory), the ISP 1276, and the additional diffraction member 1277.

The lens assembly 1271 may collect light emitted from an object, a target of which an image is to be captured. The lens assembly 1271 may include one or more lenses (e.g., the at least one optical element 130 of FIG. 1).

The camera module 1270 may include a plurality of lens assemblies 1271. In an example, the camera module 1270 may constitute, for example, a dual camera, a 360-degree camera, or a spherical camera. A portion of the lens assemblies 1271 may have the same lens properties (e.g., an angle of view, a focal length, an auto focus, an f number, or an optical zoom), or at least one of the lens assemblies 1271 may have one or more lens properties that are different from those of other lens assemblies. The lens assembly 1271 may include, for example, a wide-angle lens or a telephoto lens.

The flash 1272 may emit light to be used to intensify light that is to be emitted or reflected from an object. The flash 1272 may include, for example, one or more LEDs (e.g., a red-green-blue (RGB) LED, a white LED, an infrared (IR) LED, or a ultraviolet (UV) LED), or a xenon lamp.

The image sensor 1273 may obtain an image corresponding to an object by converting, into an electrical signal, light emitted or reflected from the object and transmitted via the lens assembly 1271. The image sensor 1273 may include, for example, one image sensor selected from among image sensors having different attributes, for example, an RGB sensor, a black-and-white (BW) sensor, an IR sensor, or a UV sensor, or a plurality of image sensors having the same attribute or a plurality of image sensors having different attributes. The image sensor 1273 may be, for example, a charged coupled device (CCD) sensor or a complementary metal-oxide-semiconductor (CMOS) sensor, but examples of which are not necessarily limited thereto.

The image stabilizer 1274 may move at least one lens included in the lens assembly 1271 or the image sensor 1273 in a specific direction or control (e.g., control read-out timing) an operation characteristic of the image sensor 1273, in response to a movement of the camera module 1270 or the electronic device 1200 including the camera module 1270. This may compensate for at least a portion of a negative effect by the movement on an image to be captured.

The image stabilizer 1274 may sense a movement of the camera module 1270 or the electronic device 1200 using a gyro sensor (not shown) or an acceleration sensor (not shown) disposed inside or outside the camera module 1270. The image stabilizer 1274 may be implemented as an optical image stabilizer, for example.

The memory 1275 may at least temporarily store therein at least a portion of images obtained through the image sensor 1273 for a subsequent image processing operation. For example, when image acquisition is delayed by a shutter or a plurality of images is obtained at a high speed, an obtained original image (e.g., a Bayer-patterned image or a high-resolution image) may be stored in the memory 1275, and a copy image (e.g., a low-resolution image) corresponding the original image may be previewed through a display. Subsequently, when a specified condition (e.g., a user input or a system command) is satisfied, at least a portion of the original image stored in the memory 1275 may be obtained and processed by, for example, the ISP 1276. The memory 1275 may be configured as at least a part of the memory 1230 or as a separate memory operated independently of the memory 1230. For another example, the memory 1275 may be or include a non-transitory computer-readable storage medium instructions that, when executed by the ISP 1276, configure the ISP 1276 to perform any one, any combination, or all of operations and/or methods of the ISP 1276.

The ISP 1276 may perform one or more image processing operations on an image obtained through the image sensor 1273 or an image stored in the memory 1275. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). Additionally or alternatively, the ISP 1276 may control at least one of the components (e.g., the image sensor 1273) included in the camera module 1270. For example, the ISP 1276 may control an exposure time, a read-out timing, and the like. The image processed by the ISP 1276 may be stored again in the memory 1275 for further processing, or be provided to an external component (e.g., the memory 1230, the display module 160, the electronic device 102, the electronic device 104, or the server 108) of the camera module 1270. The ISP 1276 may be configured as at least a part of the processor 1210 or as a separate processor operated independently of the processor 1210.

When the ISP 1276 is configured as a processor separate from the processor 1210, at least one image processed by the ISP 1276 may be displayed as it is without a change or be displayed through the display 1250 after additional image processing is performed by the processor 1210. In an example, the image signal processor ISP 1276 may be or include the controller 150 of FIG. 1.

The electronic device 1200 may include a plurality of camera modules 1270 having different properties or functions. For example, the plurality of camera modules 1270 including lenses (e.g., lens assemblies 1271) having different angles of view may be configured, and the electronic device 1200 may control the camera modules 1270 to change an angle of view of a camera module 1270 based on a user's selection. For example, at least one of the camera modules 1270 may be a wide-angle camera, and at least another one of the camera modules 1270 may be a telephoto camera. Similarly, at least one of the camera modules 1270 may be a front camera, and at least another one of the camera modules 1270 may be a rear camera. In addition, the plurality of camera modules 1270 may include at least one of a wide-angle camera, a telephoto camera, a color camera, a monochrome camera, or an IR camera (e.g., a time of flight (TOF) camera or a structured light camera). According to one or more embodiments, the IR camera may operate as at least a part of a sensor module (e.g., the sensor module 176 of FIG. 1). For example, the TOF camera may operate as at least a part of a sensor module for sensing a distance to an object.

The controllers, electronic devices, processors, memories, displays, camera modules, lens assemblies, flashes, image sensors, image stabilizers, ISPs, image sensor 140, controller 150, electronic device 1200, processor 1210, memory 1230, display 1250, camera module 1270, lens assembly 1271, flash 1272, image sensor 1273, image stabilizer 1274, memory 1275, ISP 1276, and other apparatuses, devices, units, modules, and components disclosed and described herein with respect to FIGS. 1-12B are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12B that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An optical system of an under-display camera (UDC), comprising:
    a display comprising pixels having a first periodic structure;
    an image sensor disposed under a screen of the display;
    one or more optical elements disposed between the display and the image sensor and configured to form an image of an external scene on the image sensor; and
    an additional diffraction member comprising an array of elements having a second periodic structure and configured such that the second periodic structure overlaps the first periodic structure by an offset of the elements to redirect a second light which is a portion of a first light corresponding to the external scene transmitted to the image sensor through the display.

2. The optical system of claim 1, wherein the array of the elements overlaps an array of the pixels to attenuate the second light.

3. The optical system of claim 1, wherein the additional diffraction member is either one of integrated into the display and disposed in front of the display.

4. The optical system of claim 1, wherein the additional diffraction member constitutes a layer between the display and the one or more optical elements.

5. The optical system of claim 1, wherein the elements each have a shape of any one of circle, square, rectangle, regular pentagon, regular hexagon, and regular octagon.

6. The optical system of claim 1, wherein the elements have the same transmittance or different transmittances, along one or more axes of the array.

7. The optical system of claim 1, wherein the elements each have a transmittance greater than or equal to zero (0).

8. The optical system of claim 1, wherein a size of each of the elements arranged along one or more axes of the array is 0.5 times a size of each of the pixels.

9. The optical system of claim 1, wherein the elements are shifted along one or more axes of the array by an offset of 0.5 times a first arrangement period of the first periodic structure.

10. The optical system of claim 1, wherein a second arrangement period of the second periodic structure is the same as a first arrangement period of the first periodic structure.

11. The optical system of claim 1, further comprising a controller configured to generate the image based on the first light corresponding to the external scene transmitted to the image sensor through the display.

12. An electronic device, comprising:
a memory;
a display comprising pixels having a first periodic structure;
a camera module; and
a processor operatively connected to the display, the camera module, and the memory,
wherein the camera module comprises:
an image sensor disposed under a screen of the display;
one or more optical elements disposed between the display and the image sensor and configured to form an image of an external scene on the image sensor; and
an additional diffraction member comprising an array of elements having a second periodic structure and configured such that the second structure overlaps the first structure by an offset of the elements to redirect a second light which is a portion of a first light corresponding to the external scene transmitted to the image sensor through the display.

13. The electronic device of claim 12, wherein the processor is configured to:
transmit the first light from the external scene imaged through the first structure of the pixels; and
shift the elements based on the offset such that the second structure overlaps the first structure at regular intervals.

14. The electronic device of claim 12, wherein the elements each have a transmittance greater than or equal to zero (0).

15. The electronic device of claim 12, wherein a size of each of the elements arranged along at one or more axes of the array is 0.5 times a size of each of the pixels.

16. The electronic device of claim 12, wherein the elements are shifted along one or more axes of the array by an offset of 0.5 times a first arrangement period of the first structure.

17. The electronic device of claim 12, wherein a second arrangement period of the second structure is the same as a first arrangement period of the first structure.

18. A processors-implemented method of operating an optical system of an under-display camera (UDC), the method comprising:
transmitting a first light from an imaged scene through a first periodic structure of pixels of a display; and
by an array of elements having a second periodic structure of an additional diffraction member and overlapping the first structure by an offset of the elements, redirecting a second light which is a portion of the first light by diffraction of the additional diffraction member.

19. The method of claim 18, wherein the array of the elements of the additional diffraction member overlaps an array of the pixels to attenuate the second light.

20. The method of claim 18, further comprising: shifting the elements with respect to the pixels along one or more axes of the array by 0.5 times a first arrangement period of the first structure.

* * * * *